(12) United States Patent
Pegg

(10) Patent No.: US 7,669,141 B1
(45) Date of Patent: Feb. 23, 2010

(54) VISUAL INTERFACE ELEMENT TRANSITION EFFECT

(75) Inventor: Nigel Pegg, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 438 days.

(21) Appl. No.: 11/103,344

(22) Filed: Apr. 11, 2005

(51) Int. Cl.
*G06F 3/048* (2006.01)
*G06F 3/00* (2006.01)

(52) U.S. Cl. .................. 715/781; 715/753; 715/861

(58) Field of Classification Search .......... 715/753, 715/861, 781
See application file for complete search history.

(56) References Cited

U.S. PATENT DOCUMENTS

| | | | | |
|---|---|---|---|---|
| 5,819,038 | A * | 10/1998 | Carleton et al. | 709/204 |
| 6,473,114 | B1 * | 10/2002 | Strubbe | 348/14.07 |
| 6,943,795 | B1 * | 9/2005 | Matsui et al. | 345/475 |
| 6,957,392 | B2 * | 10/2005 | Simister et al. | 715/746 |
| 2004/0027390 | A1 * | 2/2004 | Yamato et al. | 345/806 |
| 2005/0046630 | A1 * | 3/2005 | Jacob et al. | 345/475 |

OTHER PUBLICATIONS

Nicole Yankelovich, William Walker, Patricia Roberts, Mike Wessler, Johnathan Kaplan, Joe Provino Meeting Central: Making Distributed Meetings More Effective CSCW'04, Nov. 6-10, 2004 vol. 6, Issue 40 pp. 419-428.*
Sean Doherty Citrix's GoToAssist: Next Bext Thing to Being There Oct. 28, 2004.*
Microsoft Office PowerPoint Microsoft Office PowerPoint 2003 SP2 copyright 1987-2003 Microsoft Corporation screenshots.*
Steven Grosvenor "The Flash Anthology" Publisher: SitePoint Jul. 2004.*

* cited by examiner

*Primary Examiner*—William L Bashore
*Assistant Examiner*—Andrea N Long

(57) ABSTRACT

In an electronic interaction space, transitioning between a first and second screen layout includes determining a difference between the first and second screen layouts, wherein the first and second screen layouts include at least one pod each, and rendering the difference as a dynamic and intermediate screen layout that uses a representation of physical motion to present a gradual change.

20 Claims, 5 Drawing Sheets

VISUAL INTERFACE ELEMENT TRANSITION EFFECT

TECHNICAL FIELD

The present invention relates, in general, to graphical user interfaces, and, more specifically, to transitions between multiple interface layouts.

BACKGROUND OF THE INVENTION

Currently, the standard way that users interact with computers is through Graphical User Interfaces (GUIs). GUIs are usually associated with moveable windows, elements or pods, and a mouse (or other pointing device) and offer users a more intuitive interaction with computers than character-based interface alternatives. An example of a GUI is the popular WINDOWS® operating system, available from Microsoft Corporation. Applications that use GUIs are numerous, and include word processing applications, spreadsheets, databases, and the like.

One specific example of a type of application that takes advantage of GUIs are meeting space applications. Several web-based or Internet-based meeting services are available on the market currently, such as WEBEX™, available from WebEx Communications, Inc., of Santa Clara, Calif., and MICROSOFT® Live Meeting. These electronic meeting spaces offer a variety of features, but basically provide a network-based meeting space for users through interactive audio and video presentations.

In any one screen layout presented to a user in a meeting space (or other GUI-based application), there are usually one or more pods, elements, or presentation objects, that may display, for example, a document or a video image. Some meeting spaces allow a host to rearrange the screen layout, by adding, removing, and deleting pods, as the meeting is occurring.

Currently, such products use abrupt, near instantaneous screen changes, wherein the screen flickers and a second screen layout is immediately presented to the users. For a host, such screen changes may not be distracting, but to an audience of meeting participants or users, the lack of context to the change may leave them wondering about whether the screen change was purposeful or was a network glitch, or maybe even wondering what the nature of the change was, such as exactly which pods or elements were just removed or added. Further, such abrupt changes may be jarring, especially to passive audience members who may be focusing on the screen. Any kind of interruption to the host presenter's message may also cause bored audience members to drift away instead of paying attention to the meeting. Also, a user who is paying attention may be distracted from the meeting by an abrupt change. In the past, some hosts have adapted by announcing screen changes, such as by saying, "and now I am changing the screen." However, such announcements may cause a host to pause and lose his, or the audience's, attention. Moreover, the presenter may forget to warn the participants of the impending change.

BRIEF SUMMARY OF THE INVENTION

Various embodiments of the present invention make state transitions appear continuously physical to a human user. Users may perceive such changes as physical changes from one space to another space. Embodiments attempt to prevent abrupt or startling transitions that may cause a user to lose context of the state of the meeting. Such embodiments provide a logical and intuitive state transition that allows a viewing party to follow the various state changes, thus, maintaining a context of the application progression.

In one example, a client application that is associated with an audience user presents a first screen layout to the user. The client application then receives information describing a second screen layout that the meeting is progressing into. The client application analyzes the difference between the two screen layouts, such as by interpolating a straight line between a current position of a particular element or pod and a subsequent position. The client computer renders the analyzed difference to the user in an intermediate and dynamic screen transition that appears natural, gradual, and physical. For instance, in the case of moving an element or pod from one position to another, the intermediate screen transition presents translational motion of the pod from the first to the second position. A modeling engine within the client application provides instructions to render the translational motion in a natural way, such as by accelerating at the start of motion and deceleration at the end of motion, thereby mimicking recognizable, physical movement characteristics. The client computer then renders the second screen layout. The first screen layout, the intermediate screen layout, and the second screen layout, in this example, are presented to the user such that it appears that the first screen layout changes into the second screen layout In this way, when a meeting host changes a screen layout, users actually get the sense that the meeting was in one stage and it grew or smoothly morphed into another stage without any abrupt, unexpected effect. In some embodiments, the added context may work to give presence to a host and to improve audience reception.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
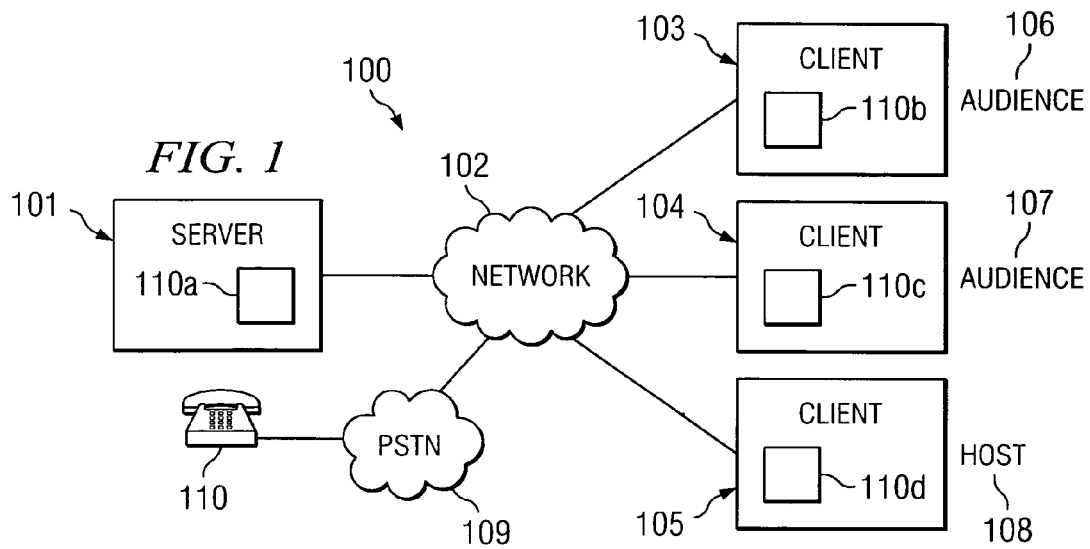
FIG. 1 illustrates an exemplary system, according to one embodiment of the invention.

FIG. 1 illustrates exemplary system 100, according to one embodiment of the present invention. System 100 includes server computer 101 separated from client computers 103-105 by network 102. Network 102 may be a Local Area Network (LAN), Wide Area Network (WAN), the Internet, or the like. Client computers 103-105 are associated with users 106-108. Users 106 and 107 may each be one or more intended audience members for a presentation conducted using system 100. Host user 108 may be one or more intended presenters or moderators for the presentation.

Each of computers 101 and 103-105 execute computer application 110, which is adapted to allow computers 101 and 103-105 to perform functions according to the present invention. In this particular embodiment, computer application 110 is a web-based personal interaction meeting space, such as BREEZE®, available from Macromedia, Inc., of San Francisco, Calif., and server application 110a is different than client applications 110b-d in that it is a server program rather than a client program. When client applications 110b-d are BREEZE® clients, they make use of a FLASH® plug-in that is also available from Macromedia, Inc. In the example presented herein, the focus will be on functions performed in client applications 110b-d; however, the invention is not limited to providing such functions only on client computers.

Host 108 is presiding over a live, web-based meeting with audience users 106 and 107 through use of application 110. The meeting incorporates both visual and audio information in that visual information, such as graphs, may be presented through monitors on each of computers 103-105, and audio information, such as the host's voice, may be presented through use of speakers on computers 103-105 or telephone 110 through Public Switched Telephone Network (PSTN). The invention is not limited to audio/video information, but is adaptable for use with other types of information, as well, such as tactile information on a Braille interface. In presenting the meeting, host 108 may desire to change the screen layout that is presented to audience 106 and 107 on their computer monitors. For instance, host 108 may desire to replace a graph pod currently on the screen with a chat pod so that audience 106-107 can present their comments and questions in written form.

Client application 110d allows host 108 to modify the screen layout. Host 108 modifies his screen layout by physically manipulating the screen objects using a pointing device or other application facility. Host 108 then selects to have that screen presented to audience 106-107. These manipulating signals are then received by server application 110a, which, in response, sends the details of the modification to each of client applications 110b and 110c. Client applications 110b and 110c provide sensory motion context that describes the modification to audience 106-107. As described in more detail below, providing sensory motion context may include, for example, displaying the removal of the graph pod and the addition of the chat pod in a way that appears natural, gradual, and somewhat physical to a human user.

Figure 2:
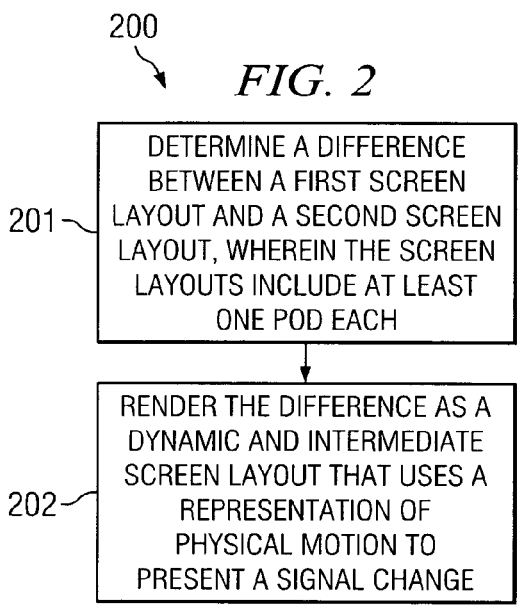
FIG. 2 is a flowchart that illustrates an exemplary method, according to one embodiment of the invention.

FIG. 2 is a flowchart that illustrates exemplary method 200, according to one embodiment of the invention. Method 200, in this example, is performed by client applications 110b-d (FIG. 1) as they present a web-based meeting to human users; however, other divisions of tasks between client and server computers is within the scope of alternative embodiments.

In block 201, the client application determines a difference between a first screen layout and a second screen layout, wherein each of the screen layouts includes at least one pod each. The difference may be that the second screen layout includes one or more different, additional pods, deletes one or more pods that were present in the first screen layout, moves a pod from one screen position to another, changes a size of a pod, or the like. In the case of a pod moving from one screen position to another, determining a difference is determining what has changed, such as by calculating a straight line between the first position and the second position. In the case of a pod being added or deleted, determining a difference includes recognizing the pod's or element's presence or absence as an event.

In block 202, the client application renders the difference as a dynamic and intermediate screen layout that uses a representation of physical motion to present a gradual change. The client application graphically shows the screen layout changing in a way that appears physical and more natural to human users. In this example, the intermediate screen layout is referred to in the singular; however, it should be understood that embodiments include presenting the intermediate screen layout as a series of discrete renderings that, to the human eye, appear as motion. The first screen layout is superceded by the intermediate screen layout, which is superceded by the second screen layout. The intermediate screen layout is rendered to the user as a way of providing context to the change. The appearance of physical motion is provided by a modeling engine in the client application that includes instructions that allow it to render graphical pods on the screen as if they were undergoing physical change.

For example, if a pod is being added in the second screen layout, the intermediate screen layout shows the pod fading in piece-by-piece. The pod is made up of a number of discrete objects, such that the piece-by-piece fading is performed one object at a time. First, the outside border portion, which is an object, is faded in, then inside object portions are faded in, and finally, informational content objects are faded in. The piece-by-piece, object-by-object construction of the pod may appear like natural, physical movement, such as a physical structure being built, instead of an unnatural, abrupt appearance caused by the pod simply instantly appearing. In another example, an intermediate screen layout that renders a change in screen position for a pod actually shows the pod moving from the first position to the second at a speed that is noticeable to the human eye, with acceleration at the start and deceleration at the end, thereby mimicking physical motion of an object. This may be used to cue a user that a change has occurred, rather than instantaneously rendering the pod in another position, which would require the user to notice the difference in the screen layout and conclude that a particular pod has moved. An example screen change is explained in greater detail below with regard to FIGS. 5-7.

Returning to FIG. 1, a modeling engine (not shown) in client applications 110b-c performs method 200. To save bandwidth in network 102, when host 108 changes a screen layout, server application 110a sends indications of the second screen layout to client applications 110b-c, rather than sending information throughout the transition. Thus, if the change in screen layout is to move a pod, server application 110a sends only the endpoint (the second position) to client applications 110*b-c*, rather than sending points along the path of its motion. The modeling engine then determines the difference by interpolating the path.

Figure 3:
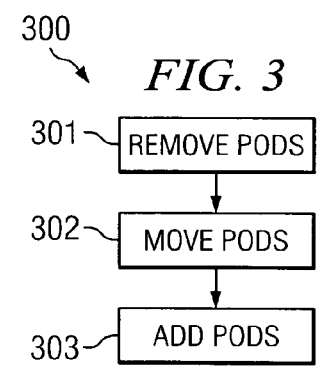
FIG. 3 is an illustration of an exemplary method, according to one embodiment of the invention.

The modeling engine includes a table that describes appropriate actions when interpolating and rendering differences to the user, and the table can be used to set prescribed actions that are presumed to require the least amount of computational intensity. The table, for instance, instructs the modeling engine to interpolate a straight line between one position and the next when moving a pod, despite a host's possibly meandering path. The table also instructs client applications 110*b-c* to perform screen changes according to a set pattern, as illustrated in FIG. 3. FIG. 3 is an illustration of exemplary method 300, according to one embodiment of the invention. First, in block 301, the client removes pods that are not in the second screen layout, but appear in the first. Second, in block 302, the client moves pods that are to be moved. Third, in block 303, the client adds pods that are in the second screen layout, but not the first. The described remove-move-add pattern operates, in some embodiments, to provide the least computationally intensive intermediate screen layout.

Another feature that is used in some embodiments to reduce computational intensity is to hide informational content during most or all of the intermediate screen layout. For instance, if a pod has an image (or other informational content) in it, and the pod is moved, the client computer renders translational motion of the pod, but does not render the image content. This is helpful when the transition is a series of frames in an animation. By removing content from each of the frames in the animation, a substantial amount of computational overhead is saved during the transition. Moreover, the user experience experiences what appears to be a curtain covering the content before the pod or element is moved. The curtain is then raised when the pod reaches its final position. The client application then renders the image as it renders the second screen layout. The curtaining effect is further described below with regard to FIG. 7. Further, fading one object portion of a pod at a time, when either removing or adding, may function to spread out the required processing over a longer time period. For instance, the deliberate gradual quality of fading may give the computer processor more time to perform the computations required to render the pod, especially when performed one object portion at a time. This may help to avoid computer slowdown, while at the same time providing a smooth transition for the human user.

While a modeling engine with tables that describe presumed least computationally intensive operations is described above, it is possible in some embodiments to build intelligence into the clients that functions to determine a least computationally intensive path at run time. For example, an algorithm may reside in memory that virtually performs various interpolations to simulate which path would be least computationally intensive. Additionally, in some embodiments the modeling engine includes instructions to interpolate and render differences without regard to computational intensity, instead, focusing on a pleasing user experience. For instance, the modeling engine may include a special physics engine that is programmed to provide a zero gravity effect with respect to the pods; other effects, such as a bouncing effect, a crumbling effect, or the like may also be used. In some embodiments, the physics engine is exposed so that a user may program or manipulate his or her own effects.

Figure 4:
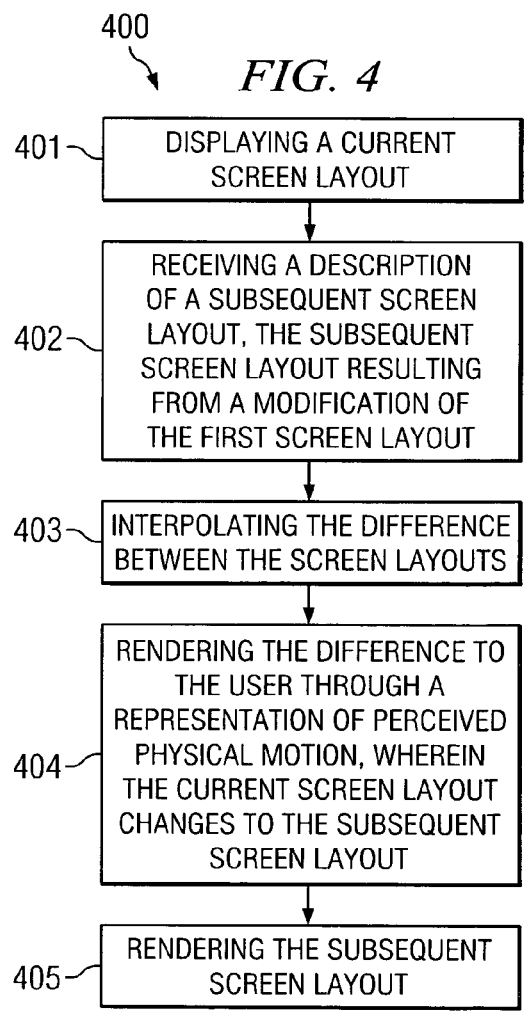
FIG. 4 is a flowchart that illustrates an exemplary method, adapted according to one embodiment, for changing a visual presentation in an electronic meeting space.

FIG. 4 is a flowchart that illustrates exemplary method 400, adapted according to one embodiment, for changing a visual presentation in an electronic meeting space. In block 401, a client application, such as one of client applications 110*b-d* (of FIG. 1), displays a current screen layout. In block 402, the client application receives a description of a subsequent screen layout that results from a modification of the current screen layout. In block 403, the client application interpolates the difference between the two screen layouts, such as, for example, by calculating a straight line between a first position and a second position of a pod. In block 404, the client application renders the difference through a representation of perceived physical motion, wherein the current screen layout changes to the subsequent screen layout. The difference may be presented as a series of discrete renderings that mimic physical motion. In block 405, the client application renders the subsequent screen layout. In this way, a human user sees the first screen layout and watches it gradually change into the second screen layout. In one embodiment, three-quarters of a second for rendering the difference provides a quick change that is readily perceivable by users and provides much motion context to help users adjust from one screen layout to the next. Rendering the first screen layout, then rendering the difference, and finally rendering the second screen layout in an uninterrupted way may provide a fluid and physical transition and a less jarring experience for the user.

Figure 5:
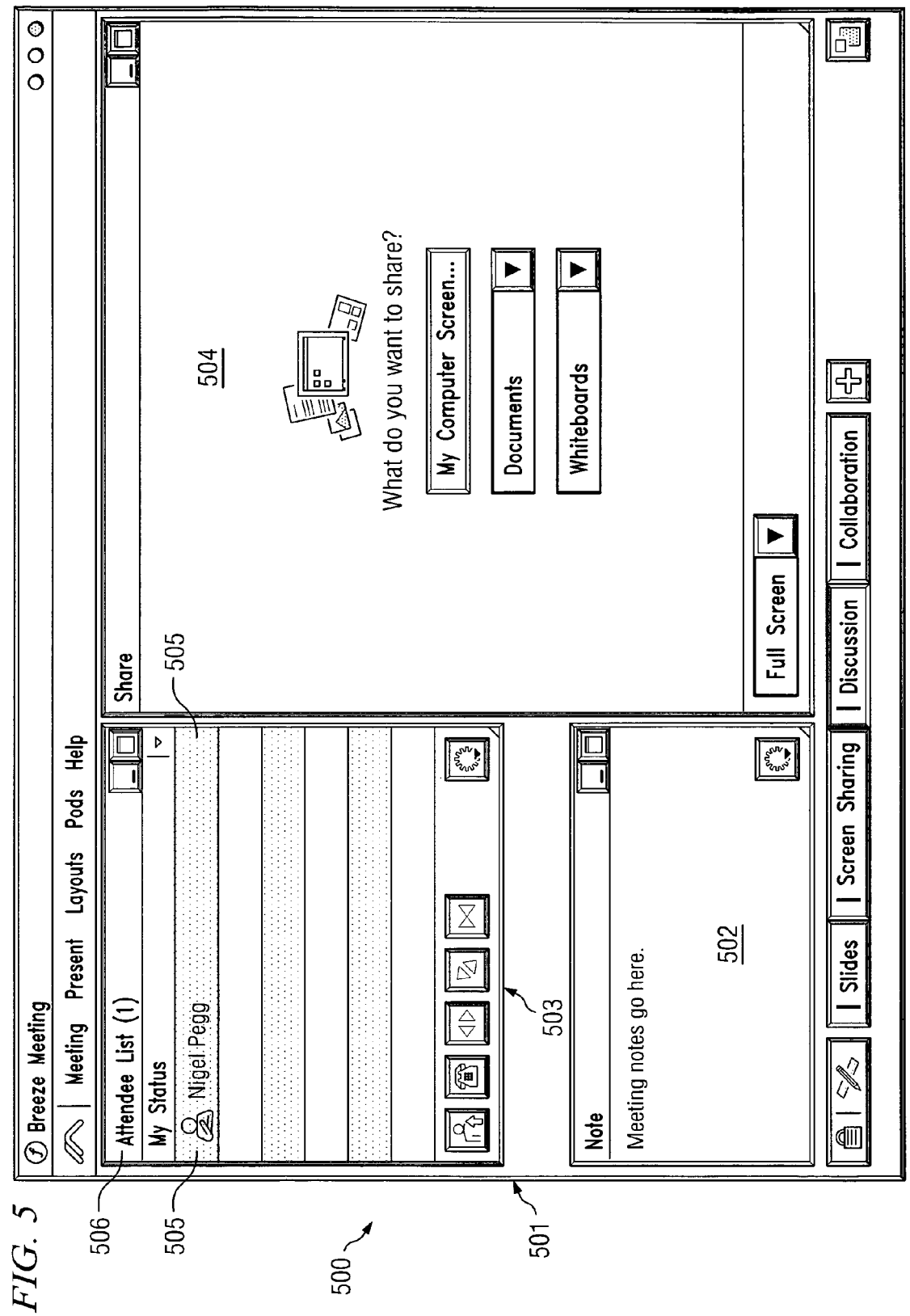
FIG. 5 illustrates an exemplary screen layout, according to one embodiment of the invention.

FIG. 5 illustrates example screen layout 500, according to one embodiment of the invention. Screen shot 500 includes screen controls 501 and pods 502-504. Pod 503 includes content 505 and title bar 506. Screen layout 500 may be a first screen layout, a second screen layout, or may even be the last of one hundred screen layouts. However, in this example it is treated as a first screen layout that is changed to a second screen layout, as described below.

Figure 6:
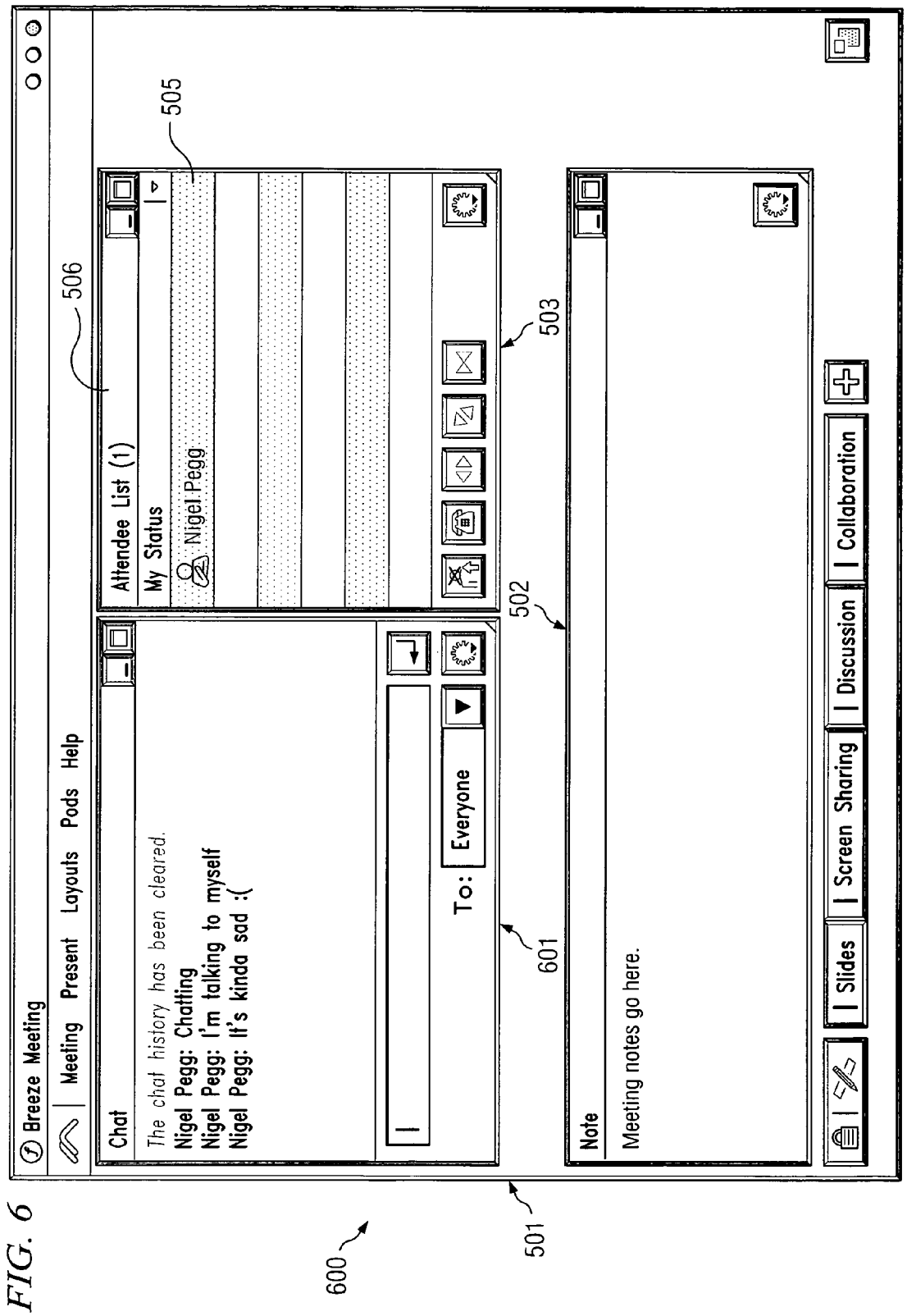
FIG. 6 illustrates an exemplary screen layout, according to one embodiment of the invention.

FIG. 6 illustrates example screen layout 600, according to one embodiment of the invention. Screen layout 600 includes controls 501 and pods 502, 503, and 601. Screen layout 600 is a second screen layout that results from a modification of screen layout 500 (FIG. 5). In changing from screen layout 500 to screen layout 600, pod 504 (FIG. 5) has been deleted, while pod 601 has been added. Also, pod 502 has changed in shape, while pod 503 has changed in shape and position.

Figure 7:
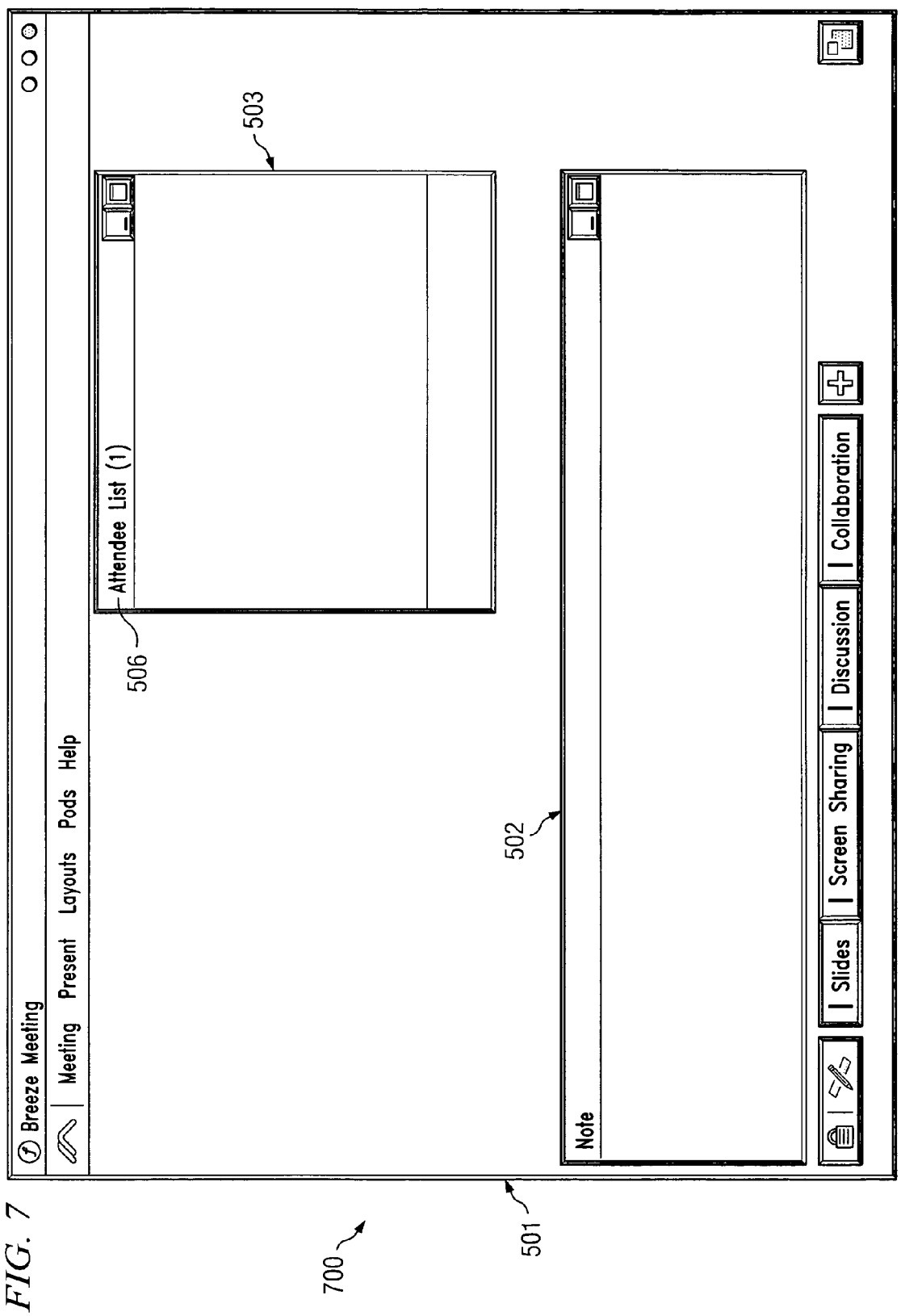
FIG. 7 illustrates an exemplary screen layout, according to one embodiment of the invention.

FIG. 7 illustrates example screen layout 700, according to one embodiment of the invention. Screen layout 700 is a single frame in an animation sequence of discrete renderings. As explained above, an intermediate screen layout is a series of discrete renderings that appear to a human as representing physical motion. Rather than showing hundreds or thousands of intermediate renderings, FIG. 7 is presented as one of many discrete renderings for convenience. It should also be noted that screen layout 700 depicts the "move" portion of the remove-move-add process, described above with regard to FIG. 3. Pods or elements that are to be deleted from screen layout are already removed in this view, while pods to be added to the screen layout are not shown in this view. Accordingly, pod 504 (of FIG. 5) has been faded out such that it is removed, and pod 601 (FIG. 6) has yet to be rendered. As explained above, the adding and removing is performed through fading, and object-by-object in each pod. Screen controls 501 are unchanged.

Pods 502 and 503 are in the process of changing shape and moving positions. Pod 503 has moved from the far left side of the screen to near the middle, and is shorter and wider than in FIG. 5, but narrower than in FIG. 6. Content object 505 (FIG. 5) is not rendered in screen layout 700 in order to reduce processing requirements. Title bar object 506 is rendered, although alternative embodiments may apply a similar curtaining effect to title bars as to content objects. Acceleration and deceleration are not readily illustrated in a still screen layout, such as layout 700; however, it should be understood that the translational motion of pod 503 is performed as described above according to the instruction of the modeling engine and includes such acceleration and deceleration. The amount of acceleration and deceleration is predetermined to cause visually-cognizable motion.

Further, the resizing of pod 503 is performed in a similar manner to the positioning, such that the various sides may experience translational motion, thereby changing the shape of the pod during the intermediate layout. Pods 502 and 503 are resized in this manner.

In a web-based meeting environment, a client application would display screen layout 500 first. The client application (associated with an audience user) would then receive a description of layout 600 after a host user changes the visual characteristics of the presentation. The client application interpolates the difference between screen layouts 500 and 600, by, for example, determining a straight line for motion of pod 503 and a place for pod 601 to be created. The client application then renders the difference to the audience user by presenting a series of discrete renderings that includes screen layout 700.

Although the examples above involve live web-based meetings, the invention is not so limited. In fact, the invention may be used in a version of BREEZE® that allows for recorded meetings. In such a scenario, a user may use a seek function to move from one point in the recorded meeting to another point. The client application then renders the difference between the presentation at the two points, thereby providing a smooth transition between two (possibly non-consecutive) screen layouts in a recorded environment.

Various embodiments of the invention may provide one or more advantages over prior art electronic meeting spaces. Making the meeting experience more pleasurable to a user may provide a higher attention rate. Creating a more natural meeting environment may also provide social reinforcement by giving presence to the host. Further, in embodiments that allow audience members to adjust their own screen layouts, these features give the audience members something interesting to play with instead of only allowing them to passively watch.

In some prior art meeting spaces, there is a need to give users some meta information about what is going on in the meeting space. This is because there is so little to see in a meeting room in many prior art spaces, and users may desire other ways of observing the events in the room. In some cases, a user will be just one of a thousand people sitting on the receiving end at a meeting, and any extra amount of context information that can be provided to the user may keep the user more psychologically involved and receptive in the meeting.

Increasing receptivity benefits both hosts and audience members. For example, various embodiments give a host the tools that make their manipulation of the artificial meeting world look resounding, physical, and interesting, thereby delivering a psychological effect to the people watching. For instance, if an audience user is watching a change to the meeting space, and the change is graceful and interesting, that may make the audience user more responsive to the host's presentation because the application provides a sense of a real environment in which the host is working.

Another advantage of some embodiments is that screen layout changes are smooth and may feel more natural, thereby leading users from one point to another. In prior art systems that simply change a screen layout instantaneously, users may be jarred and distracted from the meeting content.

Also, such features of various embodiments add context to screen changes by effectively telling a user that a change is happening and showing the change occurring. In prior art systems, a change would instantaneously occur, and a user would have to remember the previous screen layout to know specifically what change happened. A corollary to this point is that when context is provided to users, the users know when there is a deliberate change in screen layout, versus a network glitch. For instance, a user who sees a pod fade out object-by-object would know that the change was a purposeful deletion of the pod. However, in prior art systems, if a pod simply disappears, it may be unclear to audience members whether the pod was supposed to be removed.

The examples above refer to web-based meeting spaces; however, it is understood that various embodiments of the invention may be adapted for use in other applications. For example, electronic slideshow presentations may benefit from the invention by using intermediate slide layouts during slide changes. In fact, any GUI-based application progressing from one screen state to another may adopt embodiments of the present invention.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) In fact, readable media can include any medium that can store information.

Figure 8:
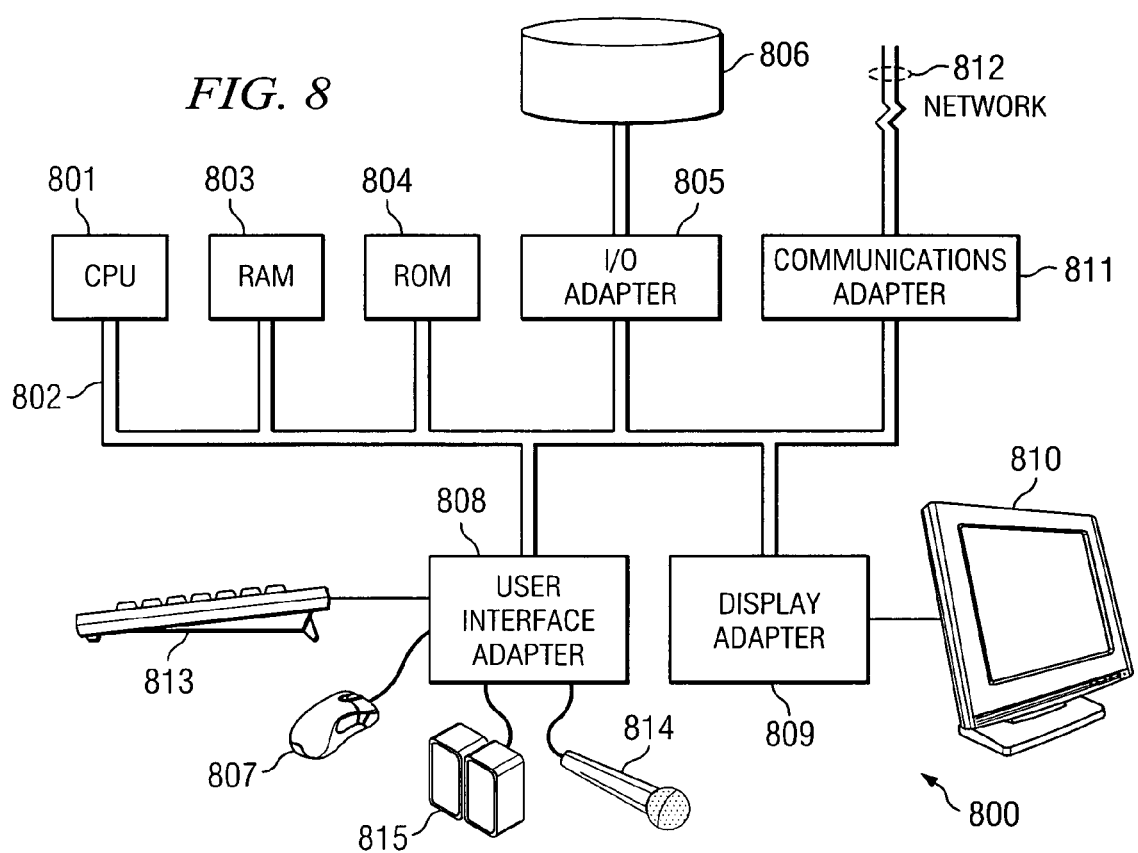
FIG. 8 illustrates an exemplary computer system adapted according to one embodiment of the invention.

FIG. 8 illustrates an example computer system 800 adapted according to embodiments of the present invention. That is, computer system 800 comprises an example system on which embodiments of the present invention may be implemented (such as client computers 103-105 and server computer 101 of the example implementation of FIG. 1). Central processing unit (CPU) 801 is coupled to system bus 802. CPU 801 may be any general purpose CPU. The present invention is not restricted by the architecture of CPU 801 as long as CPU 801 supports the inventive operations as described herein. CPU 801 may execute the various logical instructions according to embodiments of the present invention. For example, CPU 801 may execute machine-level instructions according to the exemplary operational flows described above in conjunction with FIGS. 2-4.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as when a host changes a screen layout with a mouse or other pointing device.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for an electronic meeting space. Communications adapter 811 is preferably adapted to couple computer system 800 to network 812 (e.g., network 102 described in FIG. 1). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display the user interface (such as that of FIGS. 5-7) of embodiments of the present invention.

It shall be appreciated that the present invention is not limited to the architecture of system 800. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a description of a second screen layout from a server computer, at one or more client computers, the server and the one or more client computers creating a web-based meeting space;
   determining, at the one or more client computers, a difference between a first screen layout and the second screen layout by comparing said first screen layout to the description of said second screen layout received from the server computer, wherein the first and second screen layouts include at least one pod each;
   rendering, at the one or more client computers, the difference as a dynamic and intermediate screen layout that uses a representation of physical motion to present a gradual change, wherein rendering the difference includes selecting prescribed actions that require the least amount of computational intensity.

2. The method of claim 1 wherein determining a difference between the first screen layout and the second screen layout comprises:
   interpolating movement that describes the difference between the first screen layout and the second screen layout.

3. The method of claim 1 wherein rendering the difference to a user comprises the sequential steps of:
   rendering the first screen layout;
   rendering the intermediate screen layout;
   rendering the second screen layout.

4. The method of claim 3 wherein rendering the intermediate screen layout comprises presenting a series of discrete renderings as frames in an animation.

5. The method of claim 1 wherein rendering the difference to a user comprises the sequential steps of:
   removing ones of the at least one pod that are absent from the second screen layout;
   moving other ones of the at least one pods to a new position in the second screen layout; and
   adding further ones of the at least one pod that are added in the second screen layout.

6. The method of claim 1 wherein rendering the difference comprises one or more of the following actions:
   fading-in ones of the at least one pod to be added in the second screen layout;
   fading-out other ones of the at least one pod to be removed from the first screen layout;
   adding further ones of the at least one pod one object at a time; moving additional ones of the at least one pod by showing translational motion between a first position and a second position, wherein the translational motion includes acceleration at the start of the moving and deceleration at the end of the moving; and
   hiding content in the at least one pod while the difference is rendered.

7. The method of claim 6, wherein the actions are defined by a physics engine that provides a representation of perceived physical motion.

8. A method comprising:
   receiving, from a server, a description of a final screen layout for a visual presentation in an electronic meeting space, the final screen layout resulting from a modification of a current screen layout;
   interpolating, by a client device, a difference between the final and current screen layouts, wherein interpolating the difference includes determining a least-computationally-intensive way to render the difference;
   rendering the interpolated difference to a user of the electronic meeting space through a representation of perceived physical motion, wherein the current screen layout changes to the final screen layout while hiding at least a portion of informational content of a pod and simultaneously showing the pod.

9. The method of claim 8 wherein receiving a description of a final screen layout includes receiving a location of an element in the final screen layout.

10. The method of claim 9 wherein interpolating the difference between the final and current screen layouts includes determining a straight line of translational motion from a location of the element in the current screen layout to the location of the element in the final screen layout.

11. The method of claim 8 wherein the perceived physical motion may include one or more of: translational motion of an element; object-by-object removal of an element; object-by-object appearance of an element; fading; crumpling of an element; and zero-gravity effect on an element.

12. The method of claim 8 wherein the receiving, interpolating, and rendering are performed during playback of an on-line collaborative meeting.

13. The method of claim 8 wherein the receiving, interpolating, and rendering are performed by an on-line collaborative meeting space software.

14. The method of claim 13 wherein the on-line collaborative meeting space software includes a central server portion and a client portion associated with the user, and wherein the client portion performs the receiving, interpolating, and rendering.

15. A computer program product having computer program logic recorded on a computer readable medium, the computer program product comprising:

client code for providing an electronic meeting space, wherein the electronic meeting space includes an arrangement of one or more visual pods in a computer interface;

client code for modifying the arrangement by receiving instructions from a host to change a screen layout and determining how to modify the arrangement based upon the instructions which include a final layout and based upon the computational intensity required for said modification; and client code for providing sensory motion context that visually describes the modifying, wherein the sensory motion context increases audience attention in a live or recorded on-line meeting presented within the electronic meeting space.

16. The computer program product of claim 15 wherein the code for providing sensory motion context includes:

code for producing a visual representation of perceivable motion with regard to one or more of the visual pods.

17. The computer program product of claim 15 wherein at least one of said one or more visual pods includes multiple object portions, and the code for providing sensory motion context includes code for causing the at least one of said one or more visual pods to appear by rendering one object portion at a time.

18. The computer program product of claim 15 wherein the code for modifying the arrangement includes code for adding other visual pods, code for moving ones of said one or more visual pods, and code for removing ones of said one or more visual pods.

19. The computer program product of claim 15 wherein the computer program product is a product that when executed provides a web-based real-time or recorded meeting space for a plurality of users.

20. The computer program product of claim 15 wherein the code for providing sensory motion context includes code for producing a visual representation of perceivable motion with regard to visual pods while simultaneously hiding information content of the visual pods during said providing sensory motion context.

* * * * *

UNITED STATES PATENT AND TRADEMARK OFFICE
CERTIFICATE OF CORRECTION

PATENT NO. : 7,669,141 B1  Page 1 of 1
APPLICATION NO. : 11/103344
DATED : February 23, 2010
INVENTOR(S) : Nigel Pegg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 673 days.

Signed and Sealed this

Seventh Day of December, 2010

David J. Kappos
*Director of the United States Patent and Trademark Office*